(12) United States Patent
Balls et al.

(10) Patent No.: US 11,916,789 B2
(45) Date of Patent: Feb. 27, 2024

(54) PREFIX LENGTH EXPANSION IN PACKET PROCESSORS

(71) Applicant: MICROSOFT TECHNOLOGY LICENSING, LLC, Redmond, WA (US)

(72) Inventors: Steven Balls, Enfield (GB); Matthew Ian Ronald Williams, London (GB); Abhishek Pandey, London (GB); Daniel Thomas O'Brien, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/343,655

(22) Filed: Jun. 9, 2021

(65) Prior Publication Data

US 2022/0337520 A1 Oct. 20, 2022

(30) Foreign Application Priority Data

Apr. 15, 2021 (GB) ...................................... 2105368

(51) Int. Cl.
*H04L 12/745* (2013.01)
*H04L 45/748* (2022.01)

(52) U.S. Cl.
CPC .................................. *H04L 45/748* (2013.01)

(58) Field of Classification Search
CPC ......... H04L 45/02; H04L 45/20; H04L 45/42; H04L 45/60
See application file for complete search history.

(56) References Cited

U.S. PATENT DOCUMENTS 6,011,795 A 1/2000 Varghese et al.
2005/0100012 A1* 5/2005 Kaxiras ................. H04L 45/742
370/389

(Continued)

FOREIGN PATENT DOCUMENTS

WO 2019173410 A1 9/2019

OTHER PUBLICATIONS

"International Search Report and Written Opinion Issued in PCT Application No. PCT/US22/022233", dated Jun. 15, 2022, 13 Pages.

(Continued)

*Primary Examiner* — Mansour Oveissi
(74) *Attorney, Agent, or Firm* — Han Gim; Newport IP, LLC (57) ABSTRACT

A method performed by a packet processor comprises retrieving a first prefix length for a first lookup stage and a shorter second prefix length for a second lookup stage. The packet processor can receive instructions to program an action entry. The length of the action entry prefix is compared to the first prefix and second prefix length. If it is determined that the length of the action entry prefix is shorter than the second prefix length, the second prefix length is selected as an expanded prefix length. If it is determined that the length of the action entry prefix is longer than the second prefix length and shorter than the first prefix length, then the first prefix length is selected as the expanded prefix length. Expanded action entries are generated with expanded prefixes of the expanded prefix length and stored at the lookup stage associated with the expanded prefix length.

20 Claims, 7 Drawing Sheets

(56) References Cited

U.S. PATENT DOCUMENTS

2019/0280959 A1* 9/2019 Liu .................. H04L 45/021
2022/0109626 A1* 4/2022 Wang ................ H04L 45/42

OTHER PUBLICATIONS

"LPM6 Library", Retrieved from: https://doc.dpdk.org/guides/prog_guide/lpm6_lib.html, Retrieved on Sep. 14, 2021, 5 Pages.

Asai, et al., "Poptrie: A Compressed Trie with Population Count for Fast and Scalable Software IP Routing Table Lookup", In Journal of ACM SIGCOMM Computer Communication Review, vol. 45, Issue 4, Aug. 17, 2015, pp. 57-70.

Ganegedara, et al., "100+ Gbps IPv6 Packet Forwarding on Multi-Core Platforms", In Proceedings of the IEEE Global Communications Conference, Dec. 9, 2013, 6 Pages.

Gupta, et al., "Routing Lookups in Hardware at Memory Access Speeds", In Proceedings of IEEE INFOCOM '98, the Conference on Computer Communications. Seventeenth Annual Joint Conference of the IEEE Computer and Communications Societies. Gateway to the 21st Century, Mar. 29, 1998, 8 Pages.

Zec, et al., "DXR: Beyond Two Billion IPv4 Routing Lookups per Second in Software", Retrieved from: https://web.archive.org/web/20210224205021/http://www.nxlab.fer.hr/dxr/, Feb. 24, 2021, 5 Pages.

Zec, et al., "DXR: Towards a Billion Routing Lookups per Second in Software", In Journal of ACM SIGCOMM Computer Communication Review, vol. 42, Issue 5, Oct. 2012, pp. 30-36.

Zec, et al., "Pushing the Envelope: Beyond Two Billion IP Routing Lookups per Second on Commodity CPUs", In Proceedings of the 25th International Conference on Software, Telecommunications and Computer Networks, Sep. 21, 2017, 6 Pages.

* cited by examiner

PREFIX LENGTH EXPANSION IN PACKET PROCESSORS

CROSS-REFERENCE TO RELATED APPLICATION(S)

This non-provisional utility application claims priority to UK patent application number 2105368.1 entitled PREFIX LENGTH EXPANSION IN PACKET PROCESSORS and filed on 15 Apr. 2021, which is incorporated herein in its entirety by reference.

BACKGROUND

Packet processors are designed to perform actions on large numbers of packets efficiently based on control information in each packet and action information stored in the packet processor. Packet processors can include memory storing tables containing action entries that associate an address or range of destination addresses for incoming packets, with an action to be performed by the packet processor. When a new packet arrives a lookup operation can be performed by the packet processor to match an address of the packet with the action entries stored in memory to find an associated action to perform on the packet. Possible actions performed on packets include forwarding, dropping the packet, encrypting/decrypting the packet and others.

The action entries in the memory of a packet processor can be associated with a single address or a subnetwork designated by a subnetwork address, herein referred to as a prefix. The existence of action entries in the table containing prefixes means there can be overlapping action entries. This leads to possible scenarios where an incoming packet can match to multiple table action entries and the packet processor has a process for selecting one action to perform.

Methods exist to configure a packet processor to select an appropriate table action entry for a packet in these overlap scenarios. One such method is longest prefix matching, where the action entry associated with the longest prefix out of the matching entries is chosen. Longest prefix matching can be particularly advantageous for packet forwarding as it selects the most specific entry out of a plurality of possible matching entries.

The embodiments described below are not limited to implementations which solve any or all the disadvantages of known methods of configuring a packet processor.

SUMMARY

The following presents a simplified summary of the disclosure to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples a method to be performed by a packet processor in a communications network is described. The method comprises retrieving from a memory of the packet processor, a first prefix length associated with a first lookup stage and a second prefix length associated with a second lookup stage. The second prefix length is shorter than the first prefix length.

The packet processor can receive instructions from a control plane of the communications network to program an action entry for a destination subnet into the packet processor, the action entry having an action entry prefix denoting the subnet. The length of the action entry prefix is compared to the first prefix length associated with first lookup stage and the second prefix length associated with the second lookup stage.

Where the length of the action entry prefix is shorter than the second prefix length, the second prefix length is selected as an expanded prefix length.

Where the length of the action entry prefix is longer than the second prefix length and shorter than the first prefix length, then the first prefix length is selected as the expanded prefix length.

A plurality of expanded action entries is then generated with the selected expanded prefix length and stored in a match-action table of the lookup stage associated with the prefix length selected as the expanded prefix length.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read considering the accompanying drawings, wherein.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples Although the present examples are described and illustrated herein as being implemented in a packet processing system, the system described is provided as an example and not a limitation. As those skilled in the art will appreciate, the present examples are suitable for application in a variety of different types of packet processing systems.

To process a packet, a packet processor can attempt to match an address or other control information in a packet header to stored action entries in one or more match-action tables. The one or more action tables can be stored in a memory of the packet processor. Access to these memory resources is required when performing a lookup for a packet. A packet processor can store thousands of entries meaning the resource usage for lookup operations is not trivial.

A packet processor configured to perform a lookup operation over all the stored action entries whenever a packet arrives for processing would require only one matching operation to successfully match the packet address. However, this approach would consume a large amount of memory resources for each lookup operation.

Other packet processor configurations have been developed that attempt to find a tradeoff between the amount of memory used per lookup and the number of lookups performed on average to process the packet. They have approached this by performing a lookup on a subset of the total stored entries each lookup operation.

One such configuration is DIR-24-8-BASIC, which splits the action entries into two tables. The first table stores action entries for subnetworks with prefixes of 24-bits or shorter, and a second table that contains the entries for the remaining bits of the prefixes to provide finer grain action entries for more specific subnetworks. This configuration was designed for internet routing where /24 subnetworks and shorter are most common. Starting the search from the /24 size and larger prefixes means the DIR-24-8-BASIC is not a true longest prefix match configuration which can be a disadvantage in smaller networks. The inventors have recognized that, in certain applications it is beneficial to perform lookups on different prefixes depending on the nature of the network that the packet processor is operating in and modify these prefix values to adapt to changes in network performance metrics. Thus, the technology is tunable and enables better use of resources as a result of this tunability.

Embodiments described below outline a packet processing system with lookup stages that perform lookups of action entries of one prefix length. These prefixes can then be modified according to the performance needs of the network. The embodiments also perform a true longest prefix match and so can reduce the number of processing operations required compared to alternative implementations with initial lookups being performed at a more specific prefix length. A lookup stage is a hardware and/or software element storing a table of action entries with a single prefix length. Each stored action entry describing an action to be performed by the packet processor on the packet. The lookup stage performs a lookup operation to match an incoming packet address to a stored action entry prefix from the table of action entries. In some embodiments when a lookup stage has matched the packet address to an action entry the packet processor performs the action, described by the action entry, on the packet. In various examples described herein there is a first lookup stage and a second lookup stage. More than two lookup stages are used in some examples; that is, the number of lookup stages is extendible according to the particular deployment characteristics.

Figure 1:
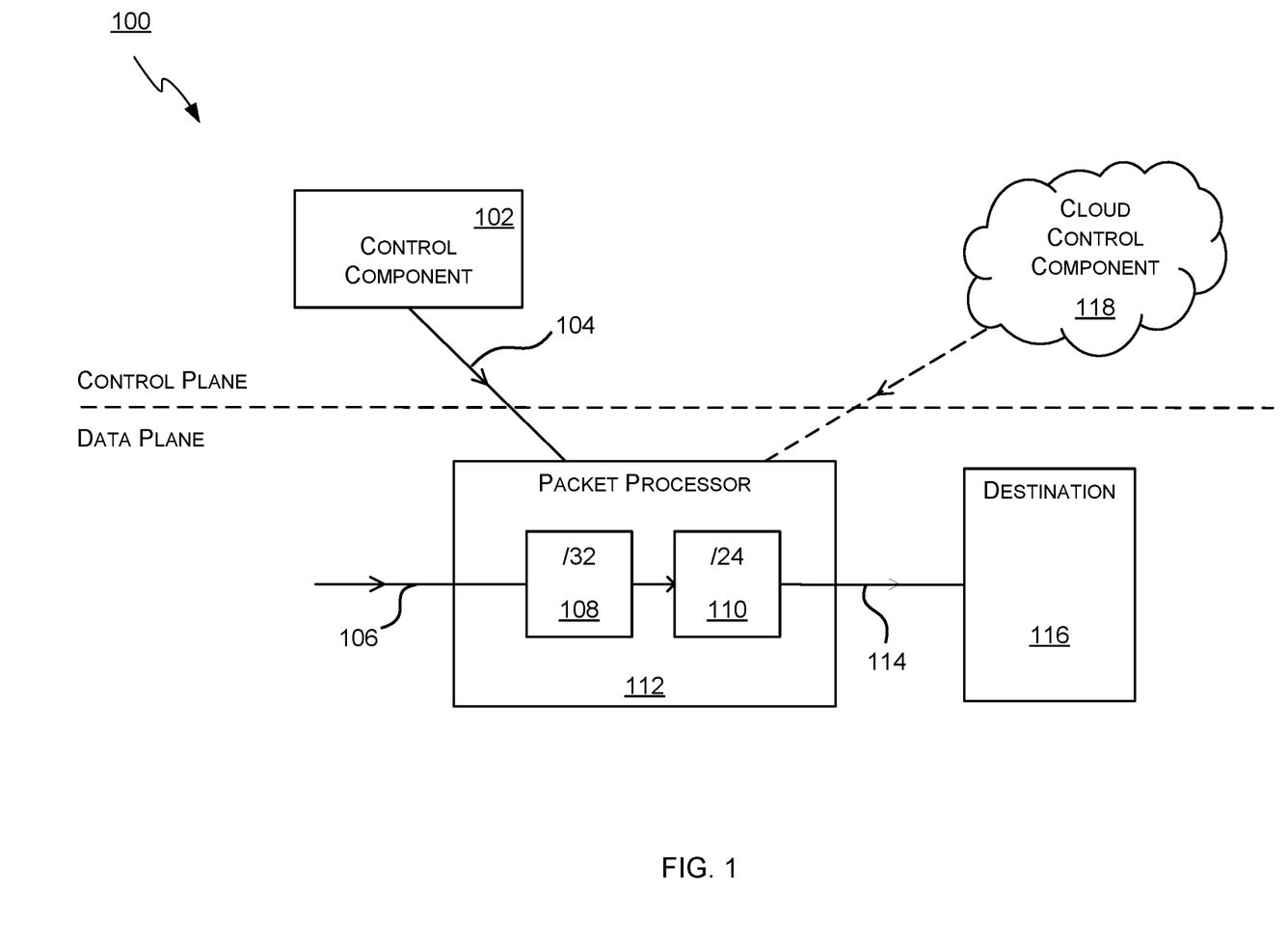
FIG. 1 is a block diagram illustrating the operation of a packet processing system featuring control plane components and a packet processor with two lookup stages.

FIG. 1 is a block diagram illustrating a packet processing system 100. The packet processing system comprises a packet processor 112, and a control component 102 of a control plane or optionally a cloud control component 118 of the control plane. Either control component 102 provides instructions to the packet processor 112 through a connection 104. The connection 104 is a wired or wireless connection. The packet processor 112 is connected to a network and receives data packets at connection 106 and, in this embodiment, forwards them at a connection 114 to a destination 116. The packet processor 112 contains a first lookup stage 108 showing /32 and a second lookup stage 110 with a label /24. In this embodiment the look up stages each contain a match-action table that match an address of packets arriving at connection 106 to an action to be performed on the packets by the packet processor 112. The /32 of the first lookup stage indicates that the match-action table used in the first lookup stage only matches packet addresses to entries with a 32-bit prefix. Similarly, the /24 of the second lookup stage indicates the second lookup stage only matches packet addresses with action entries with a 24-bit prefix.

The control component 102 or optionally cloud control component 118 provides the action entries to be stored in the match-action tables of the first lookup stage 108 and second lookup stage 110. The control component 102 may provide an action entry with a prefix of a length that does not match the prefix length of entries stored in any of the lookup stages of packet processor 112. In this case the prefix lengths of the entries are expanded for storing in the nearest highest lookup stage.

In the example embodiment of FIG. 1 the action that is performed is shown as a forwarding action of the packet to destination 116 through connection 114. This is one of many possible actions applied to a packet by the packet processor 112. In the example embodiment of FIG. 1 there are two lookup stages a first and a second lookup stage with match-action table entries comprising 32-bit and 24-bit prefixes respectively. In other examples more lookup stages are used, and/or different prefix lengths are used. For instance, in one embodiment the second look up stage is associated with a shorter prefix length such as /12, so a greater proportion of the action entries are expanded and stored in the first lookup stage. Storing a greater proportion of the action entries in the first lookup stage leads to a reduction in the average lookup operations performed per packet at the expense of increased memory usage per lookup operation. The modifiable prefix lengths of the lookup stages in the embodiments described provide greater useability of the packet processor 112 over other systems.

Figure 2:
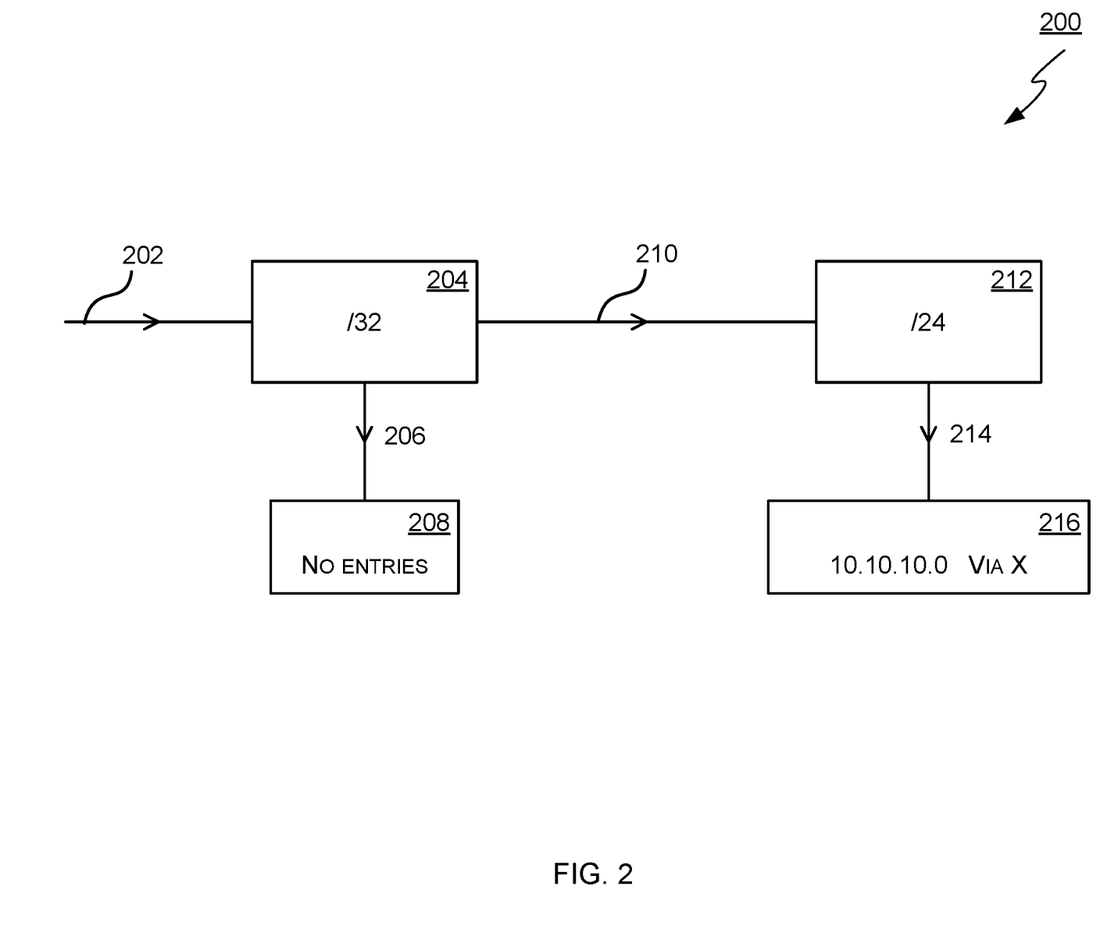
FIG. 2 is a schematic diagram of a packet processor showing action entries stored in lookup stages of a packet processor according to an example.

FIG. 2 is a block diagram illustrating a first lookup stage 204 and a second lookup stage 212. Each lookup stage performs a lookup operation of an address of packets arriving at 202 against entries of an associated prefix length. The first lookup stage 204 matches incoming packets to entries with prefixes of 32-bits during a lookup operation. In some embodiments /32 is chosen as the prefix associated with the first lookup stage as, in IPv4 networks this is the longest and therefore most specific prefix length for an entry. In embodiments where lookup operations are performed at a longest prefix in the first lookup stage 204, the packet processor 200 performs a true longest prefix match. The first lookup stage performs a lookup operation 206 by comparing the address of packets entering at 202 to a prefix of a stored action entry in match action table 208. In the table 208 there are currently no entries and any attempt to match 206 at the first lookup stage 204 leads to a miss in the lookup operation. In the event of a miss in the lookup operation the packet information is propagated to the second lookup stage 212 through connection 210.

At the second lookup stage 212 a second lookup operation 214 is performed on the packet arriving at connection 210. In this embodiment, the second lookup stage 212 stores only action entries with a prefix of 24-bits which is less specific than the prefixes of the first lookup stage 204. There is an action entry in table 216 with a prefix denoting a subnet and an associated action. The second lookup stage 212 will perform a lookup operation to match the address of the packet arriving at connection 210 to the prefix shown in table 216. In the result of a match in the lookup operation the packet processor 200 carries out the action described in the action entry of the table 216. In this example the action described in the action entry in table 216 is a forwarding action to forward via a connection X. Many different actions may be performed by the packet processor 200 such as drop, encrypt, decrypt, inspect etc.

Figure 3:
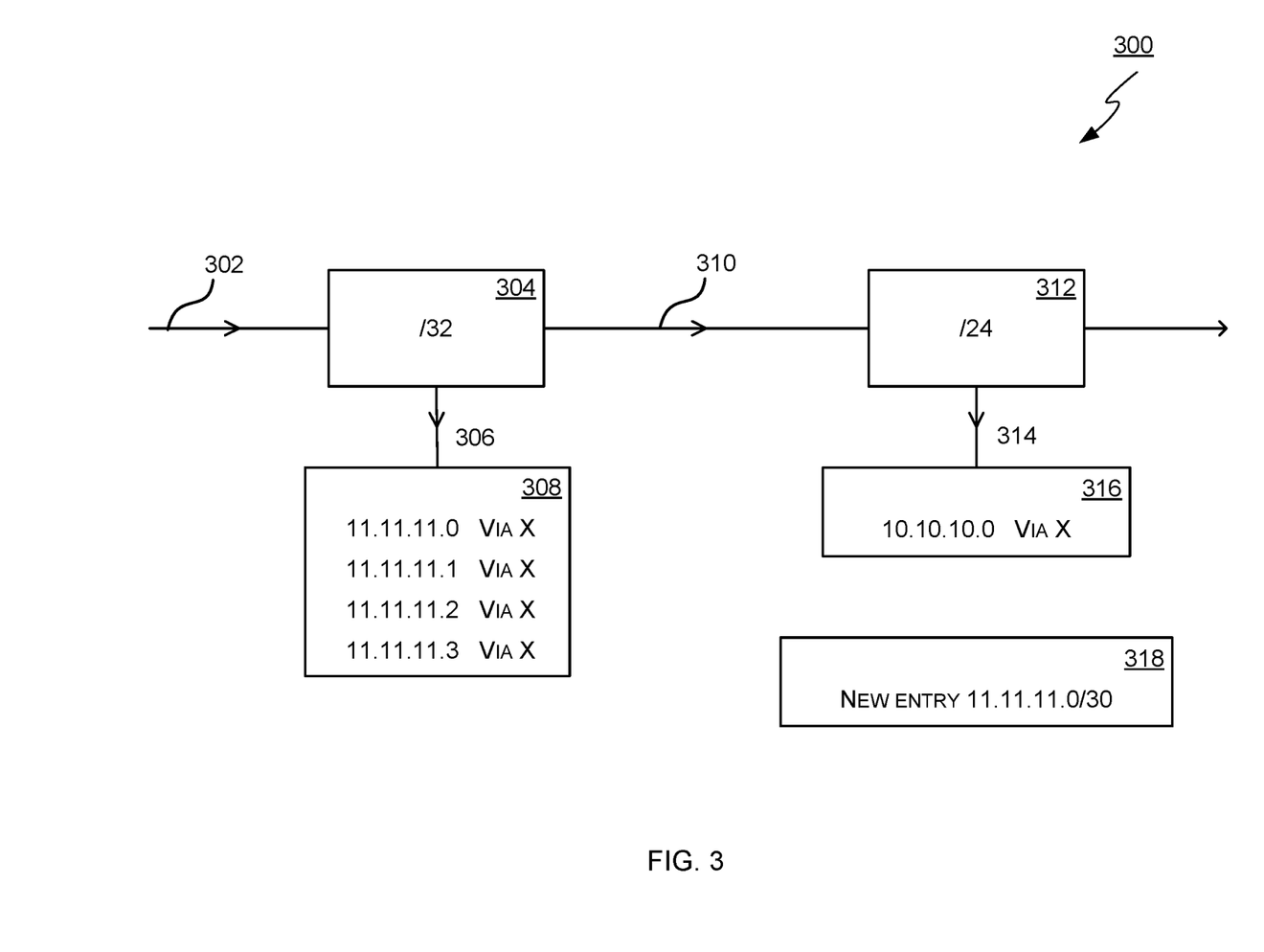
FIG. 3 is a schematic diagram of a packet processor showing expanded action entries in a lookup stage generated for a new action entry programmed to the packet processor according to an example.

FIG. 3 is a block diagram illustrating a method of programming a new action entry 318 into a packet processor 300. New entry 318 is received from a control component of a control plane or optionally a cloud control component and contains a prefix denoting a subnetwork. A prefix length for the new entry 318 is 30 bits long as shown by the /30 notation. The packet processor 300 contains a first lookup stage 304 that performs lookup operations on packets arriving at connection 302 to action entries 308 with a prefix length of 32-bits only. The packet processor also contains a second lookup stage 312 that performs lookup operations on packets arriving at connection 310 to stored action entries with a prefix length of 24-bits only. The new entry 318 with a prefix length of 30-bits therefore cannot be used in a lookup operation by either the first or the second lookup stage.

To program the new action entry 318 into the packet processor 300 the packet processor modifies the prefix of the new action entry 318. First an appropriate prefix length is selected from either the first lookup stage 304 or the second lookup stage 312. Selecting a shorter prefix length for entries is undesirable as it extends the addresses covered by the action entry beyond the designated range. Therefore, a longer prefix is chosen, in the example of FIG. 3 the larger prefix length is the 32-bit prefix length of the entries stored at the first lookup table 304. In embodiments the next longest prefix from the prefixes associated with the lookup stages to the new action entry 318 is selected.

Modifying the new action entry to a longer prefix length comprises producing expanded action entries 308. In order that the expanded action entries 308 still provide the designated address range of the new action entry 318, a plurality of expanded action entries are generated 308. As each /32 prefix at the first lookup stage 304 designates a smaller range of addresses than a /30 address range as in the new action entry 318. To determine the number of new action entries required in the longer prefix length the packet processor calculates a difference, d, between the longer prefix length and the length of the new entry prefix 318. In the example of FIG. 3 the longer prefix length is 32 and the length of the new entry prefix is 30, so d=(32−30)=2. The difference, d, shows how many extra bits are to be appended in the new action entry prefixes 308 to reach the longer prefix length.

In various embodiments, d is used to determine how many new action entries are required to provide the same range of addresses as the new action entry prefix 318. This can be determined by calculating $2^d$, in the example of FIG. 3, d=2 so there are $2^2$=4 expanded action entries generated.

Each of the $2^d$ expanded action entries 308 is then appended with a distinct sequence of bits of d length. The values of the d bits generated provide the possible combinations of binary values of d bits. In this way the expanded action entries represent all of the addresses that were designated in the new action entry 318. In the example of FIG. 3 each of the four expanded action entries 308 is appended with a 2-bit value in a unique combination resulting in prefixes that comprise the new action entry 318 appended with the values 0, 1, 2, 3 and 4. The expanded action entries 308 are stored in the selected lookup stage and associated with the same action as the new action entry 318. In this example the action information is to forward matched packets via port X. This is not a limiting example of an action as there are many possibilities of actions that are associable with a prefix such as dropping the packet, encryption etc.

Figure 4:
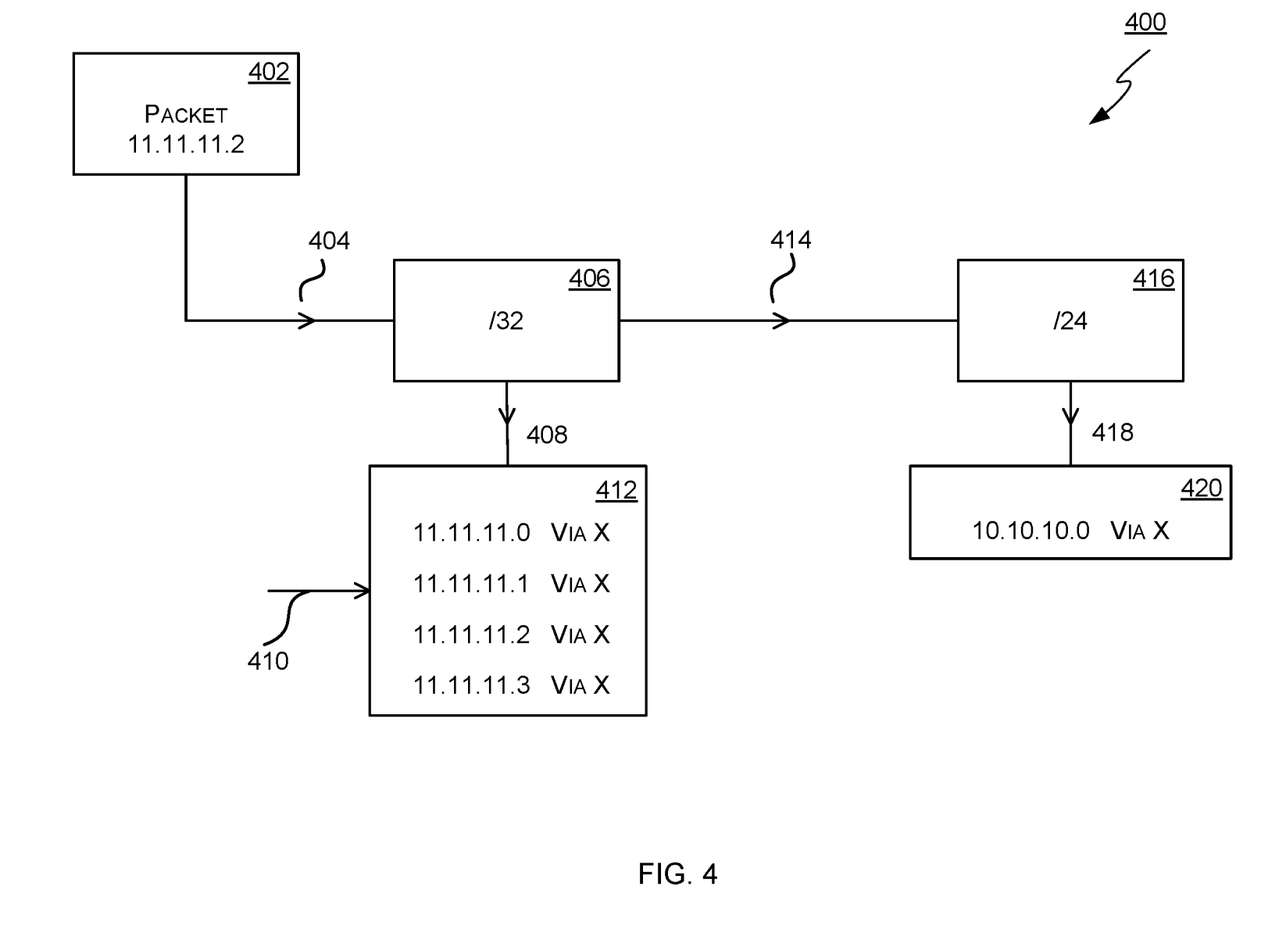
FIG. 4 is a diagram of a packet processor illustrating a method of matching a packet address to a stored expanded action entry at a first lookup stage according to an example.

FIG. 4 illustrates a packet processor 400, configured with a plurality of expanded action entries 412. The packet processor is processing an incoming packet 402. The incoming packet 402 contains an address value. The incoming packet arrives at the packet processor at connection 404 and enters a first lookup stage 406. The first lookup stage uses a plurality of action entries stored in table 412 to perform a lookup operation 408 on the incoming packet 402. A successful lookup operation results in a matching action entry 410 of the plurality of stored action entries 412 and the associated action is performed on packet 402 by the packet processor 408. The stored action entries 412 can result from the process described in FIG. 3.

In the example of FIG. 4 the first lookup stage uses 32-bits and the second lookup stage uses 24 bits, in other embodiments different prefix lengths are used. In some cases, prefix lengths are chosen based on a network protocol used such as IPv4 or IPv6 or a private network protocol that is not compatible with other packet processing technologies. The adaptability of the prefix lengths used provides improved useability of the packet processor for network operators. Furthermore, extra lookup stages can be included after the second lookup stage to reduce the memory utilization per lookup operation.

In the example illustrated in FIG. 4, the prefixes of the action entries in the table 412 of the first lookup stage 406 are 32-bits in length. The lookup operation 408 results in a successful match 410 as the address of the packet 402 corresponds to a prefix of an action entry in the plurality of action entries 412 stored at the first lookup stage 406. The action designated by the matched action entry 410 is then performed on the packet 402 by the packet processor 400. In the example of FIG. 4, the packet 402 has an address that matches the prefix of an action entry at the first lookup stage 406, and therefore an action is performed on packet 402. In this example the action performed on the packet 402, by the packet processor 400, is a forwarding action via X, but there are many other possible examples of actions.

Figure 5:
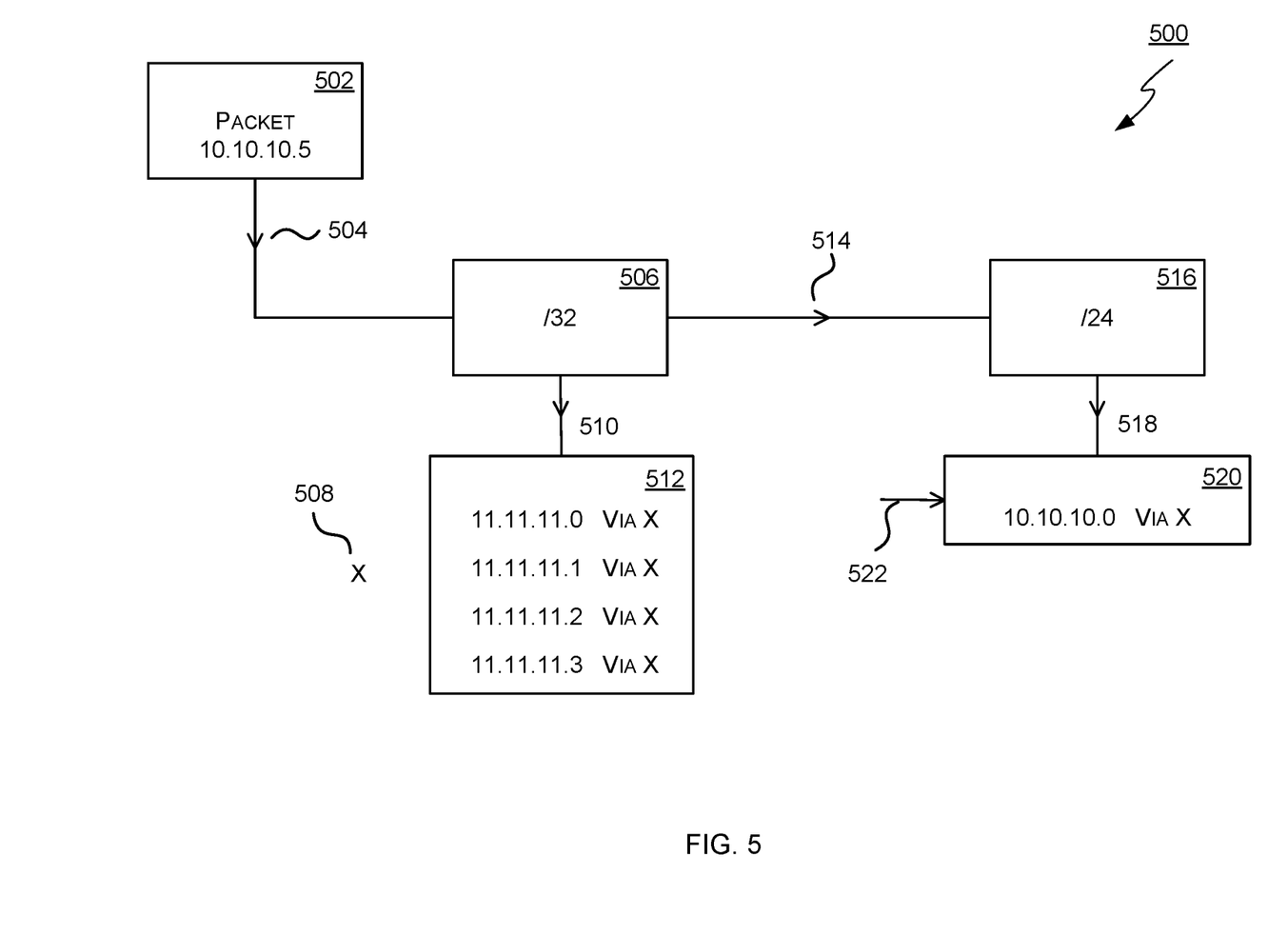
FIG. 5 is a diagram of a packet processor illustrating a method of matching a packet address to a stored action entry at a second lookup stage according to an example.

FIG. 5 illustrates a packet processor equivalent to that of FIG. 4. In this example however a packet 502 entering the packet processor 500 at a connection 504 has a different address. The address of the packet undergoes a lookup operation at a first lookup stage 506 in the same way as previously described. The address of packet 502 does not correspond to any of the action entry prefixes 512 stored at the first lookup stage and therefore the lookup operation 510 of the first lookup stage 506 results in a miss 508. In the event of the miss result 508 the packet 502 or in other embodiments only the address of packet 502, is transferred to a second lookup stage 516 through connection 514.

The second lookup stage 516 performs a lookup operation on the action entries that are stored at the second lookup stage 516. In various embodiments the lengths of the prefixes of the action entries 520 stored at the second lookup stage 516 are shorter than those stored at the first lookup stage 506 to perform a longest prefix match operation. In this embodiment the action entries 520 have prefix lengths of 24-bits, which is shorter than the prefix lengths associated with the action entries of the first lookup stage 512.

The lookup operation 518 is successful as an action entry 522, with a prefix that corresponds to the address of the packet 502, is stored at the second lookup stage 520. The action that is associated with the action entry 522 is then performed on the packet 502 by the packet processor 500. In this example the action performed on the packet 502, by the packet processor 500, is a forwarding action via X. There are many other actions that are performed on the packet by the packet processor in other examples.

Figure 6:
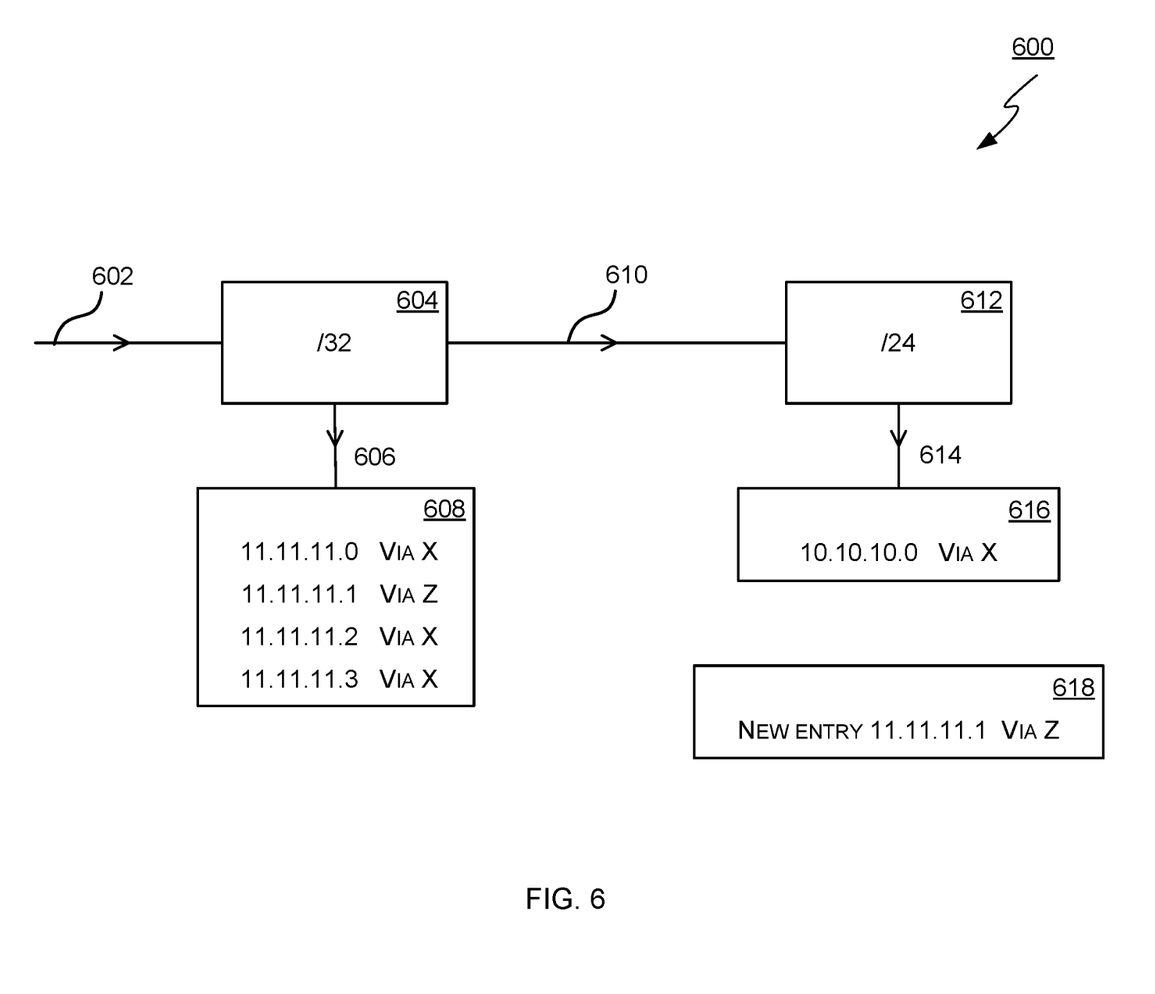
FIG. 6 is a diagram of a packet processor illustrating a method of updating a set of expanded action entries at a first lookup stage with a new entry.

FIG. 6 illustrates programming a new action entry 618 into a packet processor 600 where the new action entry 618 has a same prefix length as that associated with a lookup stage. The packet processor 600 is equivalent to the packet processor of FIG. 3 containing a first lookup stage 604 associated with action entries of one prefix length, and a second lookup stage 612 associated with action entries of a shorter prefix length. In the example of FIG. 6 the first lookup stage stores action entries 608 with a prefix length of 32-bits for use in a lookup operation 606. The second lookup stage 612 stores action entries 616 of a prefix length 24-bits for performing lookup operations 614.

In the example of FIG. 6 a new entry 618 is to be programmed with a prefix length equal to that of the action entries of the first lookup stage 604. When instructions to program the new action entry 618 are received and the prefix length of the new action entry 618 is equal to the action entry prefix lengths used by any of the lookup stages, it is stored directly at the lookup stage without expansion.

In the example of FIG. 6, the new action entry 618 with a /32 prefix is being programmed. This is equal in prefix length to the /32 entries associated with the first lookup stage 604. Therefore, the new action entry is stored directly into the table 608 without the expansion described in previous examples. The new action entry 618 has overwritten a previously stored action entry in the table 608 and there is now a new associated action with that prefix.

Figure 7:
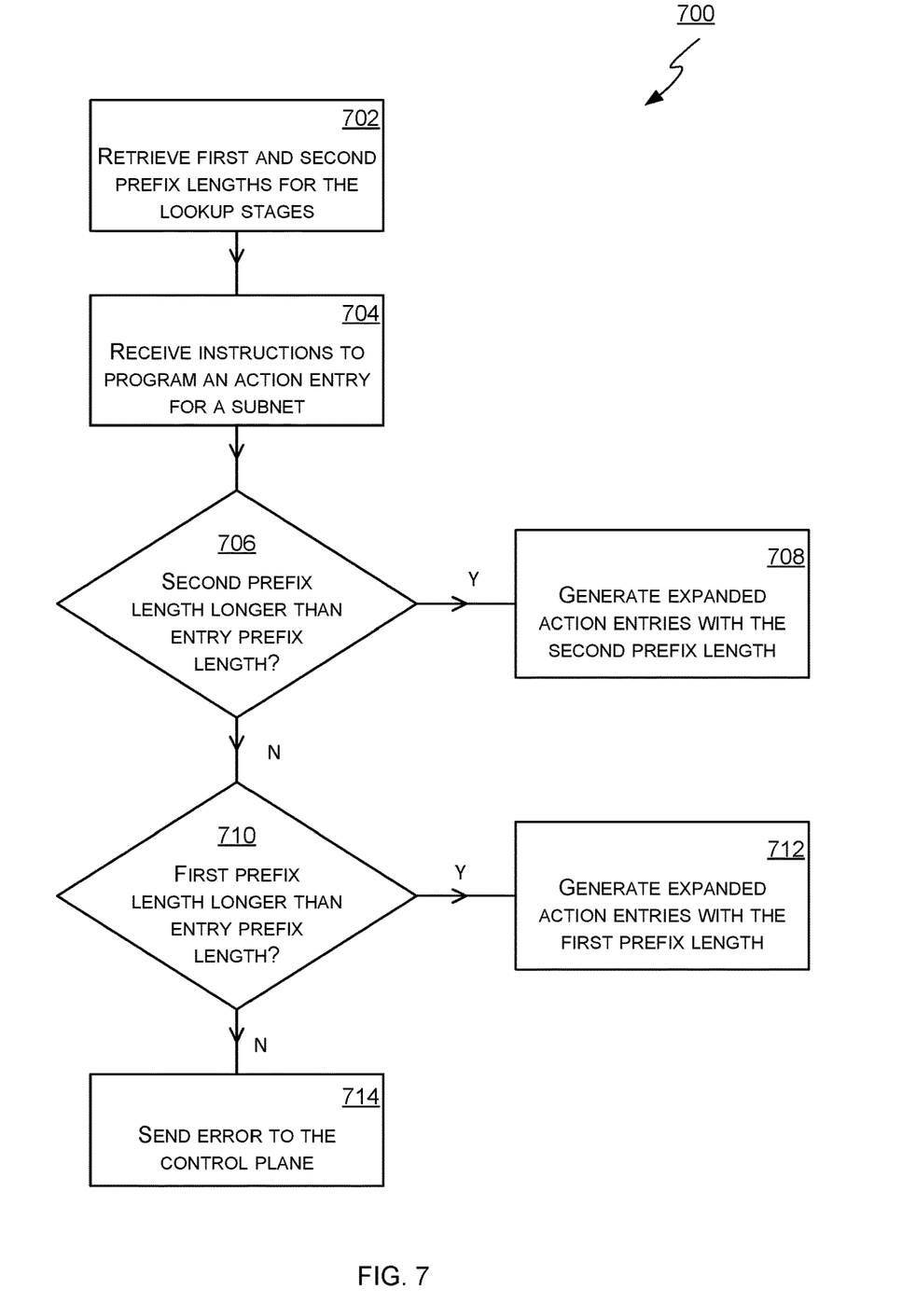
FIG. 7 is a flow chart illustrating a method performed by a packet processor according to an example.

FIG. 7 is a flowchart that illustrates an example method performed by a packet processor such as that of FIG. 1.

At block 702 the packet processor retrieves first and second prefix lengths. The first and second prefix lengths are then associated with a first and second lookup stage respectively of the packet processor. In various embodiments the first prefix length is the longest prefix length to provide a longest prefix match operation. The prefix lengths are stored on a memory of the packet processor or retrieved from a control component of the network or from a control component in the cloud.

In this embodiment there are two lookup stages; in alternative embodiments more lookup stages are used each with a different prefix length associated with them. In other embodiments the prefix lengths associated with the lookup stages are modified by the packet processor in response to measured performance metrics. The modification is triggered by the packet processor or other control plane components in communication with the packet processor. A non-exhaustive list of example performance metrics which are used is: amount of available memory, average number of look up operations, packet latency, and max throughput. Other examples of metrics which are used are: predicted performance metrics, programmatic knowledge of expected changes to programmed routes.

In some embodiments the modification of the prefix lengths associated with the lookup stages comprises decreasing the prefix length of the second lookup stage to reduce the average number of lookup operations performed. In alternative embodiments modification may be applied to increase the second prefix length to reduce the amount of memory used in each lookup operation. The prefix lengths can also be chosen based on a protocol used in a connected communications network, examples include IPv4 and IPv6 and the skilled person will be aware that alternative protocols can be implemented.

At block 704 the packet processor receives instructions to program a new action entry with a prefix denoting a sub-network into the packet processor. The instructions and new entry are received from a control plane, or from a local operator. In various embodiments the control plane comprises a connected control component on the network such as a server or other computing device. In alternative embodiments the control plane may be comprised of one or more cloud-based control components.

As the prefix length of the action entry does not have a length equal to the first or second prefix length the action entry prefix is expanded, as described in FIG. 3. The scenario described in FIG. 6, where the action entry prefix length is equal to the first or second prefix length and stored directly into the first or second lookup stage without expansion is not depicted in FIG. 7 for conciseness.

At block 706 a comparison is made to determine whether the second prefix length, associated with the second lookup stage, is longer than the length of the action entry prefix. When it is longer the packet processor moves onto block 708, if not then the packet processor moves on to block 710.

At block 708 it has been determined that the second prefix length is the nearest higher prefix length associated with a lookup stage compared to the action entry prefix length. Therefore, the action entry prefix is expanded to generate a plurality of expanded action entries with an expanded prefix length equal to the second prefix length. The expanded entries are then stored at the second lookup stage.

At block 710 another comparison is made to determine whether the first prefix length is longer than the action entry prefix length. If it is then the packet processor continues to block 712, if not then the packet processor continues to block 714.

At block 712 it has been determined that the first prefix length is the nearest higher prefix length associated with a lookup stage compared to the action entry prefix length. Therefore, the action entry prefix is expanded to generate a plurality of expanded action entries with an expanded prefix length equal to the first prefix length. The expanded entries are then stored at the first lookup stage.

At the optional block 714 the lookup stages in this embodiment have been considered for the new action entry and it has been found that the action entry is longer than the prefix lengths of the first and the second lookup stages. In this event the action entry has been programmed in error. In various embodiments an error message is returned to the control plane component that provided the instructions to program the action entry.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs).

Alternatively, or in addition to the other examples described herein, examples include any combination of the following clauses.

Clause A. A method performed by a packet processor in a communications network comprising:
    retrieving from a memory of the packet processor, a first prefix length to associate with a first lookup stage and a second prefix length to associate with a second lookup stage, wherein the second prefix length is shorter than the first prefix length;
    receiving instructions from a control plane of the communications network, to program an action entry for a destination subnet into the packet processor, the action entry having an action entry prefix;
    comparing a length of the action entry prefix to the first prefix length associated with the first lookup stage and the second prefix length associated with the second lookup stage;
    in response to determining that the length of the action entry prefix is shorter than the second prefix length, selecting the second prefix length as an expanded prefix length;
    in response to determining that the length of the action entry prefix is longer than the second prefix length and shorter than the first prefix length, selecting the first prefix length as the expanded prefix length;
    generating a plurality of expanded action entries each with the selected expanded prefix length; and
    storing the expanded action entries in a match-action table of the lookup stage associated with the prefix length selected as the expanded prefix length.

Clause B. The method of clause A further comprising: in response to determining that the entry prefix length is equal to one of the first and the second prefix length:
    storing the action entry for the subnet directly into the match-action table of the lookup stage that uses the prefix length equal to the entry prefix length;

Clause C. The method of clause A or B further comprising: receiving a packet at the packet processor;
    attempting to match an address of the packet with the action entries stored in the first lookup stage; and
    in response to a successful match, performing an action on the packet.

Clause D. The method of clause C further comprising:
    attempting to match the destination address of the packet with the action entries stored in the second lookup stage; and
    in response to a successful match at the second lookup stage, performing an action on the packet.

Clause E. The method of any of the previous clauses, further comprising a third lookup stage, wherein the third lookup stage is associated with a third prefix length shorter than the second prefix length.

Clause F. The method of any of the preceding clauses wherein generating a plurality of expanded action entries further comprises:
    calculating a difference in length, d, between the expanded entry prefix length and the entry prefix length; and
    wherein the plurality of expanded action entries comprises $2^d$ expanded action entries.

Clause G. The method of clause F, wherein each of the expanded action entries comprises an expanded entry prefix, wherein the expanded entry prefix comprises an action entry prefix appended with d binary bits, and wherein the values of the d binary bits are different for each of the expanded action entries.

Clause H. The method of any of the preceding clauses wherein the value of the first prefix length is one of 32 and 127 bits.

Clause I. The method of any of the preceding clauses wherein the value of the first and second prefix length are modified by the control plane of the communications network using at least one of latency and packet loss performance metrics.

Clause J. The method of any of the preceding clauses wherein the control plane of the communications network is a cloud-based control plane.

Clause K. A packet processor in a communications network comprising:
    at least one processor in data communication with a control plane of the network; and
    a hardware storage device in data communication with the processor, the hardware storage device having instructions thereon that cause the processor to:
    retrieve a first prefix length to associate with a first lookup stage and a second prefix length to associate with a second lookup stage, wherein the second prefix length is shorter than the first prefix length;
    receive instructions from the control plane of the communications network, to program an action entry for a destination subnet into the packet processor, the action entry having an action entry prefix;
    compare the length of the action entry prefix to the first prefix length associated with the first lookup stage and the second prefix length associated with the second lookup stage;
    in response to determining that the length of the action entry prefix is shorter than the second prefix length, select the second prefix length as an expanded prefix length;
    in response to determining that the length of the action entry prefix is longer than the second prefix length and shorter than the first prefix length, select the first prefix length as the expanded prefix length;
    generate a plurality of expanded action entries each with the expanded prefix length; and
    store the expanded action entries in a match-action table of the lookup stage associated with the prefix length selected as the expanded prefix length.

Clause L. The packet processor of claim K further comprising:
    in response to determining that the length of the action entry prefix is equal to one of the first and the second prefix length:
    store the action entry for the subnet directly into the match-action table of the lookup stage that uses the prefix length equal to the length of the action entry prefix;

Clause M. The packet processor of clause K or L further comprising:
    receive a packet at the packet processor;
    perform a lookup at the first lookup stage to match an address of the packet with each of the action entries stored in the first lookup stage; and
    in response to a successful match at the first lookup stage, perform an action on the packet.

Clause N. The packet processor of clause M further comprising:
    perform a lookup at the second lookup stage to match an address of the packet with each of the action entries stored in the second lookup stage; and
    in response to a successful match at the second lookup stage, perform an action on the packet.

Clause O. The packet processor of any of the preceding clauses wherein generating a plurality of expanded action entries further comprises:

calculate a difference in length, d, between the expanded entry prefix length and the entry prefix length; and
wherein the plurality of expanded action entries comprises 2d expanded action entries.

Clause P. The packet processor of clause O wherein each of the expanded action entries comprises a expanded entry prefix, the expanded entry prefix comprising the action entry prefix appended with d binary bits, wherein the value of the d binary bits are different for each of the expanded action entries and comprise every combination of 2d binary bits.

Clause Q. The packet processor of any of the preceding clauses wherein the value of the first prefix length is one of 32 and 128 bits.

Clause R. The packet processor of any of the preceding clauses wherein the values of the first and second prefix length can be modified by a control plane of the communications network using at least one of latency and packet loss performance metrics.

Clause S. The packet processor of any of the preceding clauses wherein the control plane of the network is a cloud-based control plane.

Clause T. A communications network comprising:
a control plane communicatively coupled to a packet processor; and
the packet processor comprising:
at least one processor in data communication with the control plane of the communications network; and
a hardware storage device in data communication with the processor,
the hardware storage device having instructions thereon that cause the processor to:
retrieve a first prefix length to associate with a first lookup stage and a second prefix length to associate with a second lookup stage, wherein the second prefix length is shorter than the first prefix length;
receive instructions from the control plane of the communications network, to program an action entry for a destination subnet into the packet processor, the action entry having an action entry prefix;
compare the length of the action entry prefix to the first prefix length associated with the first lookup stage and the second prefix length associated with the second lookup stage;
in response to determining that the length of the action entry prefix is shorter than the second prefix length, select the second prefix length as an expanded prefix length;
in response to determining that the length of the action entry prefix is longer than the second prefix length and shorter than the first prefix length, select the first prefix length as the expanded prefix length;
generate a plurality of expanded action entries each with the expanded prefix length; and
store the expanded action entries in a match-action table of the lookup stage associated with the prefix length selected as the expanded prefix length.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

The methods described herein are performed, in some examples, by computer executable instructions provided using any computer-readable media that is accessible by a computing-based device such as a node of a communications network. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method performed by a packet processor in a communications network, the method comprising:
   retrieving, by the packet processor, a first prefix length associated with a first lookup stage and a second prefix length associated with a second lookup stage, wherein the second prefix length is shorter than the first prefix length;
   receiving, from a control plane of the communications network, an instruction to program an action entry for a destination subnet, the action entry having an action entry prefix;
   in response to receiving the instruction:
      comparing a length of the action entry prefix to the first prefix length associated with the first lookup stage and the second prefix length associated with the second lookup stage;
      in response to determining that the length of the action entry prefix is shorter than the second prefix length, selecting the second prefix length as an expanded prefix length;
      in response to determining that the length of the action entry prefix is longer than the second prefix length and shorter than the first prefix length, selecting the first prefix length as the expanded prefix length;
      based on the expanded prefix length, determining a number of new action entries that are needed to provide a same range of addresses as the action entry prefix;
      based on the determined number of new action entries, generating a plurality of expanded action entries having the expanded prefix length; and
      storing the plurality of expanded action entries in:
         a match-action table of the first lookup stage when the expanded prefix length is the first prefix length; or
         a match-action table of the second lookup stage when the expanded prefix length is the second prefix length.

2. The method of claim 1 further comprising:
   in response to determining that the entry prefix length is equal to one of the first and the second prefix length:
   storing the action entry for the destination subnet directly into the match-action table of the lookup stage that uses the prefix length equal to the entry prefix length.

3. The method of claim 2 further comprising:
   receiving a packet at the packet processor;
   attempting to match an address of the packet with the action entries stored in the first lookup stage; and
   in response to a successful match, performing an action on the packet.

4. The method of claim 3 further comprising:
   attempting to match a destination address of the packet with the action entries stored in the second lookup stage; and
   in response to a successful match at the second lookup stage, performing an action on the packet.

5. The method of claim 1, further comprising retrieving a third lookup stage, wherein the third lookup stage is associated with a third prefix length shorter than the second prefix length.

6. The method of claim 1 wherein generating a plurality of expanded action entries further comprises:
   calculating a difference in length, d, between the expanded prefix length and the entry prefix length; and
   wherein the plurality of expanded action entries comprises 2d expanded action entries.

7. The method of claim 6 wherein each of the expanded action entries comprises an expanded entry prefix, wherein the expanded entry prefix comprises an action entry prefix appended with d binary bits, and wherein values of the d binary bits are different for each of the expanded action entries.

8. The method of claim 1 wherein a value of the first prefix length is one of 32 or 127 bits.

9. The method of claim 1 wherein a value of the first and second prefix length are modified by the control plane of the communications network using at least one of latency and packet loss performance metrics.

10. The method of claim 1 wherein the control plane of the communications network is a cloud-based control plane.

11. A packet processor in a communications network comprising:
   at least one processor in data communication with a control plane of the communications network; and
   a hardware storage device in data communication with the at least one processor,
   the hardware storage device having instructions thereon that, when executed by the at least one processor, cause the packet processor to:
   retrieve a first prefix length associated with a first lookup stage and a second prefix length associated with a second lookup stage, wherein the second prefix length is shorter than the first prefix length;
   in response to instructions to program an action entry for a destination subnet, the action entry having an action entry prefix, compare the length of the action entry prefix to the first prefix length associated with the first lookup stage and the second prefix length associated with the second lookup stage;
   in response to determining that the length of the action entry prefix is shorter than the second prefix length, select the second prefix length as an expanded prefix length;
   in response to determining that the length of the action entry prefix is longer than the second prefix length and shorter than the first prefix length, select the first prefix length as the expanded prefix length;
   based on the expanded prefix length, determine a number of new action entries that are needed to provide a same range of addresses as the action entry prefix;
   based on the determined number of new action entries, generate a plurality of expanded action entries having the expanded prefix length; and store the plurality of expanded action entries in:
    a match-action table of the first lookup stage when the expanded prefix length is the first prefix length; or
    a match-action table of the second lookup stage when the expanded prefix length is the second prefix length.

12. The packet processor of claim 11 where the instructions cause the packet processor to:
    in response to determining that the length of the action entry prefix is equal to one of the first and the second prefix length:
    store the action entry for the destination subnet directly into the match-action table of the lookup stage that uses the prefix length equal to the length of the action entry prefix.

13. The packet processor of claim 11 where the instructions cause the packet processor to:
    receive a packet at the packet processor;
    perform a lookup at the first lookup stage to match an address of the packet with each of the action entries stored in the first lookup stage; and
    in response to a successful match at the first lookup stage, perform an action on the packet.

14. The packet processor of claim 13 where the instructions cause the packet processor to:
    perform a lookup at the second lookup stage to match an address of the packet with each of the action entries stored in the second lookup stage; and
    in response to a successful match at the second lookup stage, perform an action on the packet.

15. The packet processor of claim 11 wherein generating a plurality of expanded action entries further comprises:
    calculate a difference in length, d, between the expanded entry prefix length and the entry prefix length; and
    wherein the plurality of expanded action entries comprises 2d expanded action entries.

16. The packet processor of claim 15 wherein each of the expanded action entries comprises an expanded entry prefix, the expanded entry prefix comprising the action entry prefix appended with d binary bits, wherein a value of the d binary bits is different for each of the expanded action entries and comprise every combination of 2*d* binary bits.

17. The packet processor of claim 11 wherein a value of the first prefix length is one of 32 or 128 bits.

18. The packet processor of claim 11 wherein values of the first and second prefix length can be modified by a control plane of the communications network using at least one of latency and packet loss performance metrics.

19. The packet processor of claim 11 wherein the control plane of the network is a cloud-based control plane.

20. A communications network comprising:
    a computing system running a control plane communicatively coupled to a packet processor; and
    the packet processor comprising:
        at least one processor; and
        a hardware storage device in data communication with the at least one processor,
    the hardware storage device having instructions thereon that, when executed by the at least one processor, cause the packet processor to:
    retrieve a first prefix length associated with a first lookup stage and a second prefix length associated with a second lookup stage, wherein the second prefix length is shorter than the first prefix length;
    in response to instructions to program an action entry for a destination subnet, the action entry having an action entry prefix:
        compare the length of the action entry prefix to the first prefix length associated with the first lookup stage and the second prefix length associated with the second lookup stage;
        in response to determining that the length of the action entry prefix is shorter than the second prefix length, select the second prefix length as an expanded prefix length;
        in response to determining that the length of the action entry prefix is longer than the second prefix length and shorter than the first prefix length, select the first prefix length as the expanded prefix length;
        based on the expanded prefix length, determine a number of new action entries that are needed to provide a same range of addresses as the action entry prefix;
        based on the determined number of new action entries, generate a plurality of expanded action entries having the expanded prefix length; and
        store the plurality of expanded action entries in:
            a match-action table of the first lookup stage when the expanded prefix length is the first prefix length; or
    a match-action table of the second lookup stage when the expanded prefix length is the second prefix.

* * * * *